United States Patent
Kurd

(10) Patent No.: US 7,395,296 B2
(45) Date of Patent: Jul. 1, 2008

(54) CIRCUITRY AND METHOD FOR PERFORMING NON-ARITHMETIC OPERATIONS

(75) Inventor: Tariq Kurd, Bristol (GB)

(73) Assignee: STMicroelectronics Limited, Bristol (GB)

( * ) Notice: Subject to any disclaimer, the term of this patent is extended or adjusted under 35 U.S.C. 154(b) by 664 days.

(21) Appl. No.: 10/291,861

(22) Filed: Nov. 8, 2002

(65) Prior Publication Data

US 2003/0115235 A1    Jun. 19, 2003

(30) Foreign Application Priority Data

Nov. 23, 2001    (EP)    ................. 01309860

(51) Int. Cl.
    *G06F 7/38*    (2006.01)
(52) U.S. Cl. .................................................. 708/495
(58) Field of Classification Search .................. 708/495
    See application file for complete search history.

(56) References Cited

U.S. PATENT DOCUMENTS

| | | | |
|---|---|---|---|
| 4,939,686 A | 7/1990 | Fandrianto | |
| 5,177,703 A | 1/1993 | Mori et al. | |
| 5,357,237 A | 10/1994 | Bearden et al. | 340/146.2 |
| 5,367,477 A | 11/1994 | Hinds et al. | 364/736.5 |
| 5,404,324 A | 4/1995 | Colon-Bonet | |
| 5,787,030 A | 7/1998 | Prabhu et al. | |
| 5,789,955 A | 8/1998 | Scheraga | |
| 5,798,955 A | 8/1998 | Matsubara et al. | |
| 5,931,943 A * | 8/1999 | Orup | 712/222 |
| 5,995,991 A * | 11/1999 | Huang et al. | 708/495 |
| 6,009,511 A * | 12/1999 | Lynch et al. | 712/222 |
| 6,108,682 A | 8/2000 | Matheny | |
| 6,138,138 A | 10/2000 | Ogura et al. | |
| 6,298,365 B1 | 10/2001 | Dubey et al. | 708/495 |
| 6,564,239 B2 | 5/2003 | Matson et al. | |
| 6,772,327 B2 * | 8/2004 | Biswas et al. | 712/245 |
| 6,847,985 B1 | 1/2005 | Gupta et al. | |
| 6,970,898 B2 * | 11/2005 | Steele, Jr. | 708/525 |
| 6,996,596 B1 * | 2/2006 | Ho et al. | 708/495 |
| 2002/0178200 A1 * | 11/2002 | Steele, Jr. | 708/495 |
| 2002/0198917 A1 * | 12/2002 | Steele | 708/495 |
| 2004/0172522 A1 * | 9/2004 | Biswas et al. | 712/225 |
| 2006/0179104 A1 * | 8/2006 | Steele | 708/671 |

OTHER PUBLICATIONS

"FPU Exponent Prediction of Possible Denorm Result"; *IBM Technical Disclosure Bulletin*, vol. 34, No. 8, Jan. 1992, pp. 199-201; XP000302090.

European Search Report, 01309860.3-1243-, dated Aug. 27. 2002.

(Continued)

*Primary Examiner*—Tan V. Mai
(74) *Attorney, Agent, or Firm*—Gardere Wynne Sewell LLP

(57) ABSTRACT

Circuitry is provided for performing a non-arithmetic operation in relation to at least one number. The circuitry includes a first part for carrying out the non-arithmetic operation in relation to the at least one number, the first part providing a result. A second part is arranged to identify at least one characteristic of the at least one number and to provide an output and correction circuitry for providing, if necessary, a correct result in dependence on the output of the second part, wherein said first and second parts are arranged to operate in parallel.

22 Claims, 3 Drawing Sheets

OTHER PUBLICATIONS

Matsubara, G et al.: "30-NS 55-B Shared Radix-2 Division and Square Root Using A Self-Timed Circuit" Proceedings of the 12th Symposium on Computer Arithmetic. Bath, Jul. 19-21, 1995, Proceedings of the Symposium on Computer Arithmetic, Los Alamitos, IEEE Comp. Soc, Press, US, vol. Symp. 12, Jul. 19, 1995, pp. 98-105, XP000548639 ISBN: 0-7803-2949-X.

Oberman, S.F. et al: "Division Algorithms and Implementations" IEEE Transactions on Computers, IEEE Inc., vol. 46, No. 8, Aug. 1, 1997, pp. 833-854, XP000701411, ISSN:0018-9340/97.

Prabhu, et al., "167 MHz Radix-8 Divide and Square Root Using Overlapped Radix-2 Stages," Proceedings of the 12th Symposium on Computer Arithmetic, IEEE Comp Soc. Press, vol. SYMP 12, pp. 155-162, Jul. 19, 1995, XP00054863945.

S. E. McQuillan, "Fast VLSI Algorithms for Division and Square Root," Journal of VLSI Signal Processing Systems for Signal, Image, and Video Tecnology, Kluwer Academic Publishers, Dordrecht, NL, vol. 8, No. 2, Oct. 1, 1004, XP000483301.

Hsiao, et al., "Design of high-speed low-power 3-2 counter and 4-2 compressor for fast multipliers," Electronics Letters, IEE Stevenage, GB, vol. 34, No. 4., Feb. 19, 1998.

P. Pirsch, "Architekturen der digitaln Signalverarbeitung," B.G. Teubner Stuttgart, pp. 79-81, XP002193162, 1996.

* cited by examiner

CIRCUITRY AND METHOD FOR PERFORMING NON-ARITHMETIC OPERATIONS

CROSS-REFERENCE

This application claims foreign priority from European Patent Application No. 01309860.3 filed Nov. 23, 2001, the disclosure of which is hereby incorporated by reference.

BACKGROUND OF THE INVENTION

1. Technical Field of the Invention

The present invention relates to a method and circuitry for performing non-arithmetic operations. In particular, but not exclusively, the invention relates to the comparison of floating point numbers.

2. Description of Related Art

Floating point units (FPU) are provided in many processor systems. Floating point units are designed to handle functions relating to floating point numbers. A floating point number is a convenient way of representing real numbers in a form which is particularly efficient for use in computer processor systems. An example is $+/-1.2345 \times 2^n$.

Floating point numbers may be divided into two categories: normalized; and de-normalized. Normalized numbers follow the standard format shown above and always have a leading "1". De-normalized numbers however have a leading "0". De-normalized numbers can be generated, for example, by dividing the smallest normalized number by 2. Some processor units will not accept or produce the de-normalized numbers. In these and other circumstances, it may be desirable to handle them in a separate manner to normalized numbers. One such method is to equate de-normalized numbers to zero. This procedure is known as "flush to zero".

Floating point units can perform both arithmetic and non-arithmetic functions involving floating point numbers. One example of a non-arithmetic function is the comparison of two floating point numbers or operands. The floating point unit tests the two operands to see if one operand is greater than or equal to the other, returning a value indicative of the result. The test results may then be used in other operations by the floating point unit or other processors in the system.

Reference is made to FIG. 1 which shows schematically a known system for comparing two operands in a floating point unit. The operands 100 are input to a detector 110 which is arranged to detect if the operands are de-normalized. If the operands are determined to be de-normalized, part 120 flushes the de-normalized number to zero. The operands are then compared in a comparator 130. Finally, the output of the comparator is input to a result correction part 140 which makes corrections to take into account the signs of the operand.

The problem with the arrangement shown in FIG. 1 is that the various steps take place sequentially. In particular, the steps required to handle de-normalized numbers are on the critical path of the floating point unit. This means that the number of clock cycles taken in order to carry out the comparison operation including all of the steps described in relation to FIG. 1 is relatively high.

It is therefore an aim of embodiments of the present invention to address or at least mitigate the problems described previously.

SUMMARY OF THE INVENTION

According to an aspect of the present invention, there is provided circuitry for performing a non-arithmetic operation in relation to at least one number, said circuitry comprising a first part for carrying out said non-arithmetic operation in relation to said at least one number, said first part providing a result, a second part arranged to identify at least one characteristic of said at least one number and to provide an output; and correction circuitry for providing, if necessary, a correct result in dependence on the output of said second part, wherein said first and second parts are arranged to operate in parallel.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Embodiments of the present invention may be applied to any numbers which contain sign information such the positive and negative numbers may be compared which may require result correction over the result of an unsigned comparison.

Embodiments of the invention may provide three functions, $x=y$, $x>y$ and $x>=y$.

Figure 1:
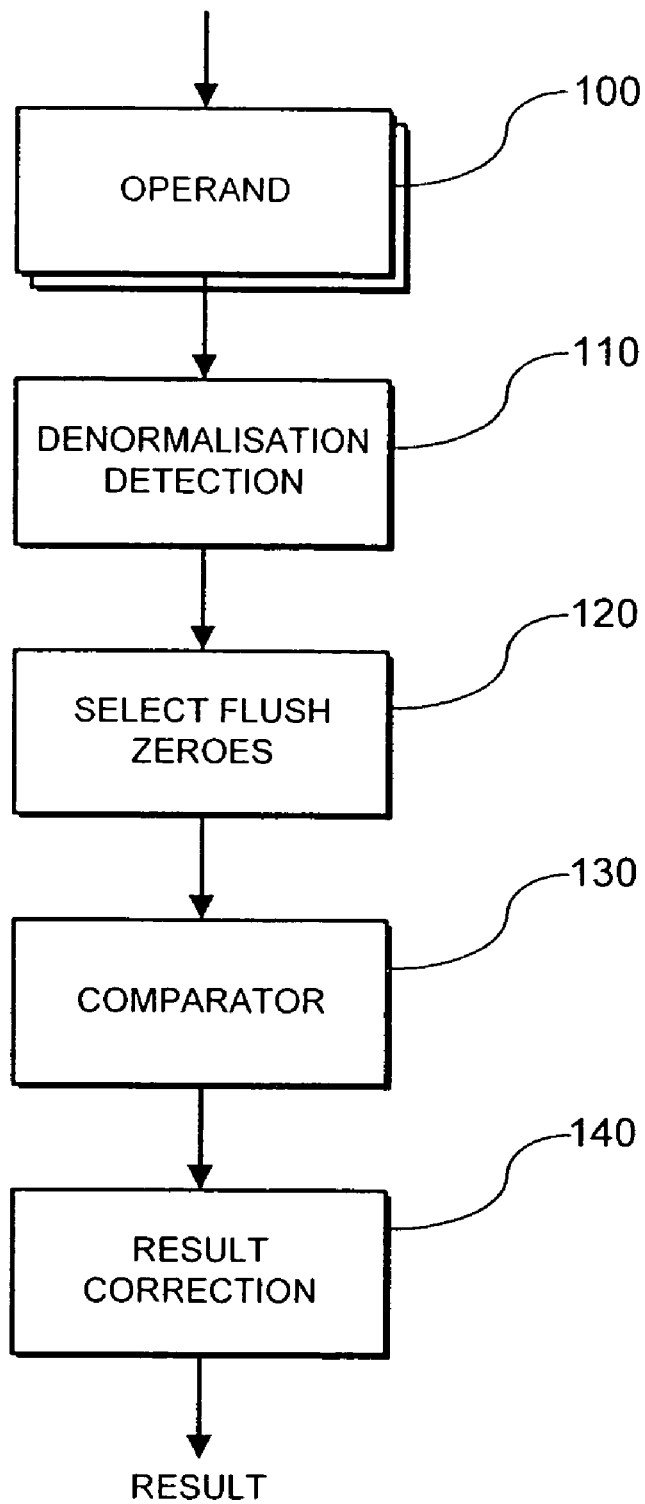
FIG. 1 is a schematic diagram of a known floating point unit.
Figure 2:
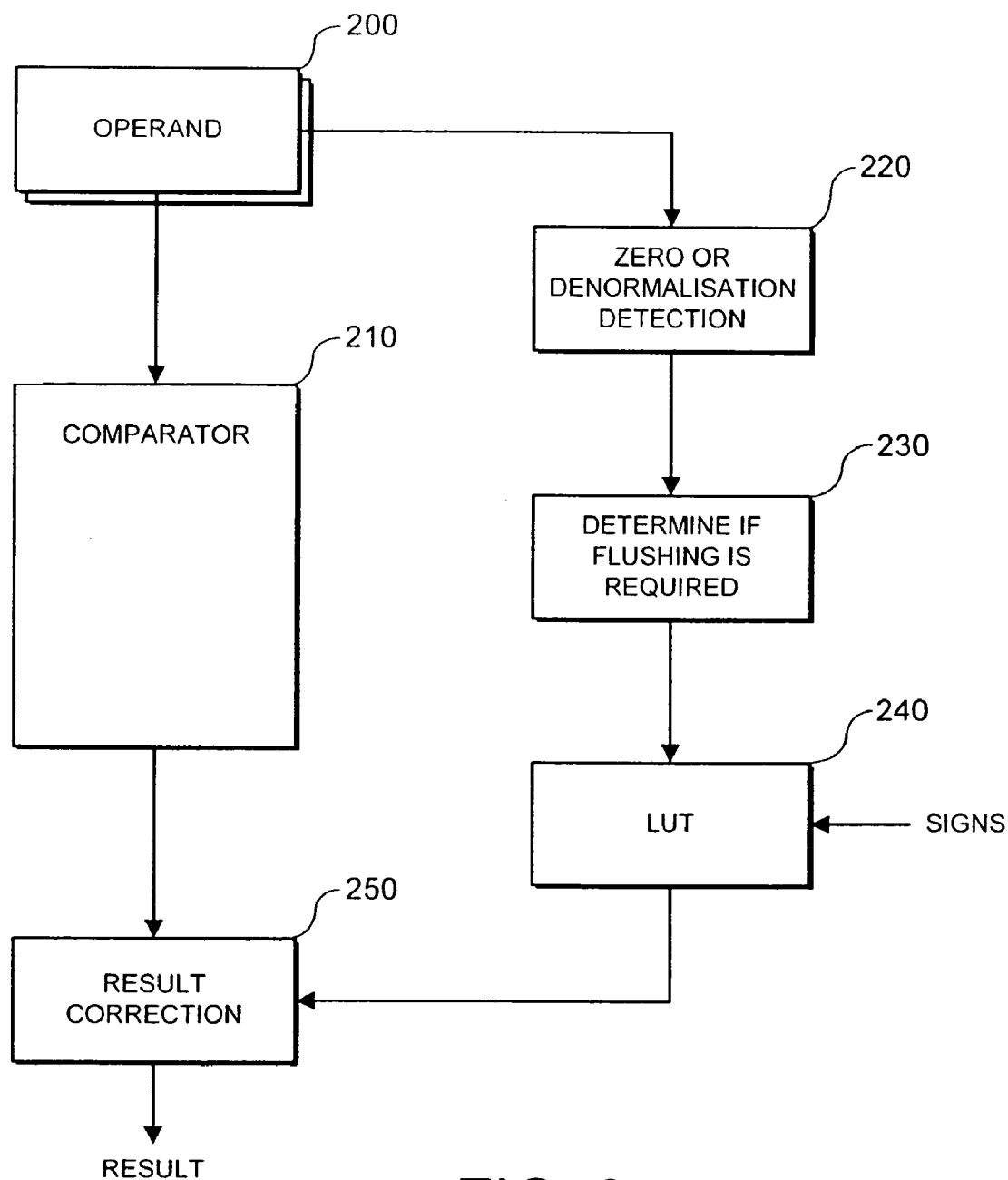
FIG. 2 is a schematic overview of embodiments of the invention.

Referring first to FIG. 2, this shows an overview of embodiments of the present invention. The operands 200 are applied, in parallel, to a comparator 210 and to a detection arrangement 220. In this example, two operands are being compared. Accordingly, two operands 200 are input to the comparator 210 which carries out a comparison operation. The detection arrangement 220 is arranged to determine if the number is a de-normalized number or zero. The output of the detection arrangement 220 is input to a flushing arrangement 230 which flushes one or both of the operands to zero if one or both of the operands is determined to be de-normalized. The output of the flushing arrangement 230 is input to a look up table 240. The look up table stores values which are selected depending on the signs of the operand and if one or more of the operands is zero or has been flushed to zero.

The output of the comparator 210 and the output of the look up table 240 are input to an arrangement 250 which if necessary corrects the results of the comparison depending on the output of the look up table 240. The corrected result is then output.

Figure 3:
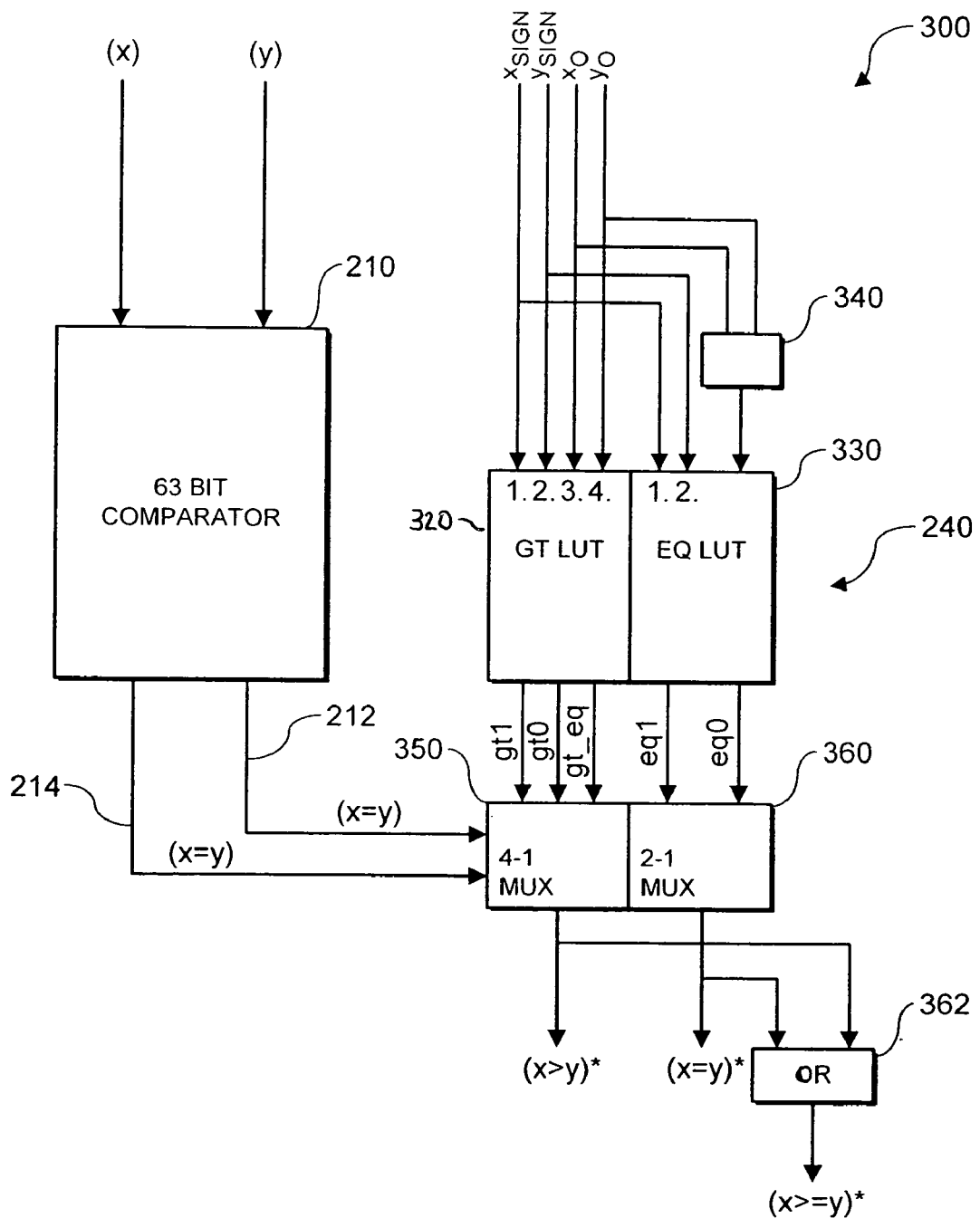
FIG. 3 shows in more detail the arrangement of FIG. 2.

Reference will be made to FIG. 3 which shows in more detail an embodiment of the present invention. The comparator 210 is a 63 bit comparator. It should be appreciated that in alternative embodiments of the present invention, any suitably sized comparator can be used. The comparator receives two operands, x and y. The comparator receives only the value itself, that is without any information as to the sign of the value. The comparator provides two outputs. The first output 212 indicates if $x=y$. The first output 212 has a first value, for example high or 1, if x is the same as y and a second different value, for example low or 0, if x is not equal to y. The second output 214 provided by the comparator 210 indicates if $x>y$. The second output 214 has a first value, for example high or 1, if x is larger than y and a second value, for example low or 0, if x is not larger than y.

As will be described in more detail hereinafter, the two outputs 212 and 214 are used to control first and second multiplexors 350 and 360. These multiplexors equate to the result correction arrangement 250 of FIG. 2.

As with the arrangement shown in FIG. 2, there are the zero or de-normalization detection and flushing arrangements. This may be provided by a single or different entities. These parts may be arranged in series or parallel. For clarity, these parts have been omitted from FIG. 3.

Arranged in parallel with the comparator 210 is a look-up table arrangement 240 comprising a first look-up table 320 for the greater than operation and a second lookup table 330 for the equal to operation. The first look-up table receives four inputs:

| | |
|---|---|
| 1. | the sign of value or operand x - xsign |
| 2. | the sign of value or operand y - ysign |
| 3. | an indication if operand x is zero or de-normalized and flushed to zero - $x_0$ |
| 4. | an indication if operand y is zero or de-normalized and flushed to zero - $y_0$ |

The second look up table receives three inputs—inputs 1 and 2 of the first look up table and the output of an AND gate 340 which receives inputs 3 and 4 of the first look up table.

The first look up table 320 is arranged to provide three outputs gt1, gt0 and gt_eq. gt1 is the result if x is greater than y and gt0 is the result if x is not greater than y. gt_eq is a flat to indicate that the greater than result depends on the result of the equal to output at the comparator. The second look up table provides two outputs eq1 and eq0. eq1 is the result if x is equal to y and eq0 is the result if x is not equal to y.

Consider the first multiplexor 350 which is controlled by both of the outputs of the comparator. If the comparator determines that x is not greater than y then the output gt0 is selected. If the comparator determines that x is greater than y then the output gt1 is selected. A third output is gt_eq is provided from 320 which overrides the selection of gt1 or gt0. If gt_eq is set to 1 then the (x>y)* result output will be set to the inverse of the comparator output 212 instead.

The output (x>y)* of the first multiplexor is the result of the comparison of x with y to determine if x is greater than y which is corrected if necessary to take into account the signs of the operand, if either one is zero or if either one is de-normalized and flushed to zero.

Consider the second multiplexor 360 which is controlled only by the output x=y from the comparator. If x is equal to y then the output is eq1 and if x is not equal to y, then the output is eq0. The output (x=y)* of the second multiplexor is the result of the comparison of x with y to determine if x is equal to y which is corrected if necessary to take into account the signs of the operand, if either one is zero or if either one is de-normalized and flushed to zero.

An OR gate 362 is provided which receives the outputs of the two multiplexors 350 and 360. This provides an indication if x is greater than or equal to y.

The overall function provided by the arrangement will now be described. If the output 212 of the comparator x=y indicates that x does not equal y, no correction is required regardless of the sign of x or the sign of y. This means that the corrected output of the second multiplexor 360 is the same as output 212 of the comparator.

Correction will be required in some circumstances if the output 212 indicates that x is equal to y. If the sign of x and y are both negative or both positive, then no correction to the output of the comparator is required. If, on the other hand, one of x and y is negative whilst the other of x and y is positive, then a correction will be required as x and y are in fact not equal.

If the output 214 indicates that x is not greater than y, no correction is required if the sign of x and y are both positive. If, on the other hand, y is negative, x will in fact be greater than y so the output needs to be corrected to indicate that x is equal to y. If x is negative and y is positive, no action is required. If x and y are both negative, the result will need to be corrected unless x and y are the same.

If on the other hand, the output 214 indicates that x is greater than y, no action is required if x and y are both positive or x is positive and y is negative. If x is negative and y is positive, the output would need to be corrected as x is no longer greater than y. If both x and y are negative, then x greater than y is not true. The corrected output will therefore be zero unless x equals y.

The correction provided by the look-up tables will now be described in more detail. In the following cases, x or y is zero may mean that the number is actually zero or that the value was a de-normalized number which has been flushed to zero.

Greater than Correction 1. x is not Greater than y

Consider first the case where x and y are both positive and it is indicated that x is not greater than y. If neither of x or y is zero, no change is required. If only y is zero, this would in fact be an illegal result. If x is zero, then the result requires no change. Finally, if both x and y are zero, again no change would be required as x is not greater than y.

Consider next the case where x is not greater than y and x is positive and y is negative. If both x and y are not zero, the result needs to be corrected to indicate that x is greater than y. If only y is zero, this would give an illegal result. If only x is zero, the result would need to be corrected as x would be greater than y. Finally, if both x and y were zero, the statement x greater than y is not true and needs to be corrected, this can arise if y is a flushed de-normalized number and x is a true zero as the comparator will indicate that y>x.

Consider next the case where x is negative and y is positive and neither of x nor y is zero. The following cases are again with the output 214 indicating that x is not greater than y. In the case where both x and y are not zero, no change is required. Again no change is required where x is zero but y is not. If x is not zero but y is zero, then the output would be an illegal output. Where both x and y are zero, the output 214 is unchanged as x is not greater than y.

Again, the output indicates that x is not greater than y but both x and y are negative. If both x and y are not zero, a change is required to the output unless x is equal to y, this case uses the gt_eq output from the look up table 320. If only y is zero, this is an illegal result. If x is zero, the result needs to be corrected to indicate that x is greater than y. If both x and y are zero, then no change is required to the output 214.

2. x is Greater than y

In the following, the signal x greater than y indicates that x is in fact greater than y. Consider first the case where x and y are both positive. If x is not zero, regardless of whether or not y is zero, no change is required. If x is zero and y is not, this is an illegal result. If both x and y are zero, the result needs to be corrected as x is not greater than y.

If x is positive and y is negative, no change is required if x is not zero, regardless of the value of y. If x is zero and y is not, this is an illegal result. If both x and y are zero, then the output needs to be corrected as x is not greater than y.

If x is negative and y is positive, the result needs to be corrected if x is not equal to zero, regardless of the value of y. If both x and y are zero, then the result needs to be corrected as x is not greater than y. If x is zero and y is not, this is an illegal result. Finally, if both x and y are negative, a correction is required if x is not zero regardless of the value of y and both x and y are zero. If x is zero and y is not, then this gives an illegal result.

Illegal results are results which do not occur in practice.

Equal to Correction 1. x is not Equal to y

The correction to the x equal y output 212 of the comparator will now be described. In the following, it is assumed that the output 212 indicates that x is not equal to y. If x is positive, no change is required to the result regardless of whether y is positive or negative if the ANDed value of $x_0$ and $y_0$ is 0. On the other hand, if the ANDed value is 1, both values must have been flushed and therefore the output needs to be modified to indicate that x equals y.

Again, it is assumed that the output indicates that x is not equal to y. In the following, x is negative. If the ANDed value is 1, then the output needs to be corrected to indicate that x equals y as both values have been flushed. No change is required if the ANDed value is zero.

2. x is Equal to y

In the following, it is assumed that the output 212 indicates that x is equal to y. If x is positive, no change is required if y is also positive. No change is required if the ANDed value is 1 and y is negative. If, on the other hand, the ANDed value is 0 and y is negative, the result needs to be corrected to indicate that x is not equal to y.

Finally, it is again assumed that x equals y and that x is negative. No change is required if the ANDed value is 1. No change is required if the ANDed value is zero and y is negative. If, on the other hand, y is positive and the ANDed value is zero, then the output needs to be corrected to zero.

The look-up tables thus each provide two results. One result will be a 1 and one result will be a 0. The inputs to the look-up table determine which of its outputs has the value 1 and which of its outputs have the value 0. The two inputs to the multiplexors 212 and 214 can each have the value 1 or 0. These inputs cause a respective one of the outputs from the look-up table to be selected to therefore provide if necessary a corrected output. Note that the multiplexor 350 has an additional input from the lookup table 320 to indicate that the (x>y)* output depends upon the output 212 from the comparator 210. Normally the output (x>y)* depends upon the output 214.

In preferred embodiments of the present invention, a look-up table has been provided. This effectively provides two outputs, one of which can be selected if the associated output of the comparator has one value and the other of which can be selected if the particular output in question has a different value. It should be appreciated that in alternative embodiments of the present invention, an alternative arrangement may be used to provide these correction values. For example, an algorithm may be performed in parallel to the comparison to provide the required values.

Preferred embodiments of the present invention have used two operands. Alternative embodiments of the present invention may involve three or more operands.

It should be appreciated that the extra functionality for the de-normalized flushing can be achieved without adding to the critical path which exists for the result correction.

It should be appreciated that preferred embodiments of the present invention have been described in relation to a comparator which determines whether one value is greater than another and whether those two values are equal. It should be appreciated that embodiments of the present invention can be arranged to carry out other comparisons such as a less than comparison, a greater than or equal comparison or a less than or equal comparison. It should be appreciated that in some embodiments of the present invention, a single comparison is performed by the comparator.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. Circuitry for performing a non-arithmetic operation in relation to at least one number, said circuitry comprising:
    a first part for carrying out said non-arithmetic operation in relation to said at least one number to generate a result signal indicative thereof;
    a second part arranged to identify at least one characteristic of said at least one number and to generate an output signal indicative thereof, wherein the second part comprises a look-up table arranged to receive information indicating the presence or absence of the at least one characteristic; and
    correction circuitry receiving the result signal and output signal and generating, if necessary, a correct result signal in dependence on the output signal of said second part,
    wherein said first and second parts are arranged to operate in parallel such that the number of clock cycles to operate first and second parts is reduced.

2. Circuitry as claimed in claim 1, wherein said non-arithmetic operation requires two numbers.

3. Circuitry as claimed in claim 1, wherein said at least one number is one of normalized and de-normalized.

4. Circuitry as claimed in claim 1, wherein said at least one number is a floating point number.

5. Circuitry as claimed in claim 1, wherein said second part is arranged to identify in the output signal the sign of said at least one number.

6. Circuitry as claimed in claim 1, wherein said second part is arranged to identify in the output signal if said at least one number is zero.

7. Circuitry as claimed in claim 1, wherein said second part is arranged to identify in the output signal if said at least one number is de-normalized.

8. Circuitry as claimed in claim 7, wherein said second part is arranged to flush said at least one number to zero if it is a de-normalized number.

9. Circuitry as claimed in claim 1, wherein said first part carries out at least one of the following operations:
    greater than comparison;
    less than comparison;
    greater than or equal to comparison;
    not equal to comparison;
    less than or equal to comparison; or
    equal to comparison.

10. Circuitry as claimed in claim 1, wherein the result signal of said first part is arranged to control said at least one multiplexor and each output signal from said second part provides an input to said multiplexor.

11. Circuitry as claimed in claim 1, wherein said second part is arranged to provide a plurality of output signals, said output signals providing all of the possible results of the first part.

12. Circuitry as claimed in claim 11, wherein said correction circuitry is arranged to cause at least one of said output signals of the second part to be provided as the correct result signal thereof.

13. Circuitry as claimed in claim 1, wherein a delay time through said circuitry is determined by the correction circuitry.

14. Circuitry as claimed in claim 13, wherein said delay time is unchanged regardless of whether or not at least one number is flushed to zero.

15. A method for performing a non-arithmetic operation in relation to at least one number, comprising the steps of:
performing, in parallel such that the number of clock cycles to operate is reduced, the following:
carrying out a non-arithmetic operation on the at least one number to generate a result signal indicative of a result of the operation;
receiving information at a look-up table indicating the presence or absence of at least one characteristic of the at least one number; and
identifying at least one characteristic of the at least one number to generate an output signal indicative of the characteristic; and
correcting the result of the non-arithmetic operation based on the identified at least one characteristic by generating a result output signal responsive to processing of the result signal and the output signal.

16. The method as in claim 15, wherein the non-arithmetic operation comprises at least one of the following operations:
greater than comparison;
less than comparison;
greater than or equal to comparison;
not equal to comparison;
less than or equal to comparison; or
equal to comparison.

17. The method as in claim 15, wherein the step of identifying identifies the sign of said at least one number.

18. The method as in claim 15, wherein the step of identifying identifies if said at least one number is zero.

19. The method as in claim 15, wherein the step of identifying identifies if said at least one number is de-normalized.

20. The method as in claim 19, wherein the step of identifying further includes the step of flushing the at least one number to zero if it is identifies as being de-normalized.

21. Circuitry for performing a non-arithmetic operation comprising a comparison of one floating point number with another floating point number, said circuitry comprising:
a first circuit for carrying out said comparison of said one floating point number with said another floating point number to generate a result signal indicative thereof;
a second circuit which identifies at least one characteristic of said one floating point number or said another floating point number and generates an output signal indicative thereof, wherein the second circuit comprises a look-up table arranged to receive information indicating the presence or absence of the at least one characteristic;
wherein said first and second circuit operate in parallel with each other such that the number of clock cycles to operate first and second circuits is reduced; and
correction circuitry comprising at least one multiplexer, the multiplexer receiving the result signal at a switching control input of the multiplexer and receiving the output signal at a data input of the multiplexer, the multiplexer generating at its output a correct result signal which is dependent on the output signal received at the data input.

22. A method for performing a non-arithmetic operation comprising a comparison of one floating point number with another floating point number, comprising the steps of:
performing, in parallel such that the number of clock cycles to operate is reduced, the following:
comparing said one floating point number with said another floating point number to generate a result signal indicative of a result of the non-arithmetic operation;
receiving information at a look-up table indicating the presence or absence of at least one characteristic of the at least one number; and
identifying at least one characteristic of said one floating point number or said another floating point number and generates an output signal indicative thereof; and
correcting the result of the non-arithmetic operation based on the identified at least one characteristic by generating a result output signal responsive to processing of the result signal and the output signal.

* * * * *